US011953852B2

(12) United States Patent
Makino et al.

(10) Patent No.: US 11,953,852 B2
(45) Date of Patent: Apr. 9, 2024

(54) IMAGE FORMING APPARATUS

(71) Applicant: CANON KABUSHIKI KAISHA, Tokyo (JP)

(72) Inventors: Masahiro Makino, Ibaraki (JP); Saeko Oishi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/743,533

(22) Filed: May 13, 2022

(65) Prior Publication Data

US 2022/0382203 A1 Dec. 1, 2022

(30) Foreign Application Priority Data

May 25, 2021 (JP) ................................ 2021-087818

(51) Int. Cl.
*G03G 15/00* (2006.01)
*G03G 21/16* (2006.01)

(52) U.S. Cl.
CPC ..... *G03G 15/5062* (2013.01); *G03G 15/5041* (2013.01); *G03G 21/168* (2013.01)

(58) Field of Classification Search
CPC ........... G03G 15/5062; G03G 15/5041; G03G 15/5058; G03G 2215/00569; G03G 2215/00067; G03G 15/50
See application file for complete search history.

(56) References Cited

U.S. PATENT DOCUMENTS 10,981,738 B2 * 4/2021 Sekigawa ................ B65H 7/06
11,606,473 B2 * 3/2023 Sekigawa .............. H04N 1/028
2013/0162998 A1 * 6/2013 Furuta .................. B41J 2/04558 356/402
2014/0248064 A1 * 9/2014 Tanaka .............. G03G 15/1675 399/314
2018/0335740 A1 * 11/2018 Kishi ................. G03G 15/0415
2020/0153999 A1 * 5/2020 Itou .................... G03G 15/5041

FOREIGN PATENT DOCUMENTS

JP 2014-107648 A 6/2014

* cited by examiner

*Primary Examiner* — Jessica L Eley
(74) *Attorney, Agent, or Firm* — VENABLE LLP

(57) ABSTRACT

An image forming apparatus includes a cassette to store a recording medium, an image forming unit to form an image on an image bearing member based on an image forming condition, a transfer unit to transfer the image onto the recording medium conveyed from the cassette, and a reading unit to read a test image formed on the recording medium by the image forming unit. A controller controls the image forming unit to form the test image while the image forming unit is forming a plurality of images, controls the image forming condition based on a reading result of the test image by the reading unit, and obtains information related to basis weight of the recording medium in the cassette. In a case where the information does not satisfy a forming condition for forming the test image, the test image is not formed.

11 Claims, 11 Drawing Sheets

IMAGE FORMING APPARATUS

BACKGROUND OF THE INVENTION

Field of the Invention

The present disclosure relates to an image forming apparatus, for example, a copying machine, a multifunction peripheral, or a printer.

Description of the Related Art

In recent years, the market for on-demand image forming apparatus is expanding. For example, in an offset printing market, an electrophotographic image forming apparatus is expanding. Moreover, the image forming apparatus of an ink-jet system, which has succeeded in broad market development due to a large format, a low initial cost, ultra-high-speed etc., is also expanding. However, the expansion of the market is not easy, and it is necessary to maintain the quality of images (hereinafter referred to as "image quality") achieved in the preceding image forming apparatus which has been available in the market. In order to maintain the image quality, an image forming condition to be used when the image forming apparatus forms an image onto a recording medium is appropriately corrected.

For example, when performing a tone correction of the image forming apparatus, an image forming condition is corrected such that the tone characteristic of the image forming apparatus matches the target tone characteristic. For correcting the tone characteristic, the tone correction table in which the tone characteristic of the image forming apparatus and the tone characteristic of the target are linked is used. The tone characteristic of the image forming apparatus varies depending on environmental conditions such as temperature and humidity, and changes in parts and members used for image formation over time. Therefore, it is necessary to periodically perform an adjustment for the tone characteristic (calibration) of the image forming apparatus to optimize the tone correction table.

Calibration may be performed using a reading result of a test image formed on the recording medium, or may be performed using a reading result of the test image on the image bearing member before transferring it on the recording medium. In these cases, the process to update the tone correction table according to the error between the tone characteristic obtained from the measurement result of the test image and the target tone characteristic is performed. In order to form the test image on the recording medium or on the image bearing member, even during a print job, the calibration can be performed in real time. Therefore, it is possible to prevent a decrease in productivity while maintaining an appropriate tone characteristic.

In an image forming apparatus disclosed in Japanese Patent Application Laid-Open No. 2014-107648, on a recording medium in which an image (user image) corresponding to an instruction from a user is formed, a test image is formed on its margin area to calibrate the image. As a result, the calibration is performed in real time. The margin area where the test image is formed is an area where the outer edge of the recording medium is to be cut. Therefore, the printed material does not include the test image.

In an electrophotographic type image forming apparatus, the image of the printed matter or the test image is formed by electrostatically transferring a developer such as toner (hereinafter, simply referred to as "toner") from the image bearing member to the recording medium (transfer step), and fixing the transferred toner on the recording medium by a fixing step. In a case where the surface property of the recording medium is not uniform, the toner may not adhere uniformly on the recording medium during the transfer process, and image unevenness may occur. Further, even if the transfer step is properly performed, when the pressure is applied in the fixing step, the pressure may not be uniformly applied, thus resulting in image unevenness. In a case where the image unevenness has occurred, the measurement result of the test image varies widely, and the image adjustment accuracy decreases.

Further, even in a case where the test image does not have the image unevenness, the image adjustment accuracy may decrease. The test image is generally detected by an optical sensor such as an image density sensor or a chromaticity sensor. In an image forming apparatus of an on-demand type, a high detection accuracy of an optical sensor is required. In order to achieve the required accuracy for the optical sensor, it is necessary to keep a predetermined distance from the optical sensor to the recording medium due to its characteristic. However, for example, a recording medium having low rigidity may represent unstable behavior (such as wave actions), and the optical sensor may not properly detect the test image. In view of the above problems, one of the objects of the present disclosure is to provide an image forming apparatus that determines whether or not a recording medium can be used for adjusting an image forming condition to stabilize image adjustment accuracy.

SUMMARY OF THE INVENTION

An image forming apparatus according to the present disclosure includes: an image forming unit configured to form an image on a recording medium based on an image forming condition, a detection unit configured to detect a test image on the recording medium, a controller configured to: obtain information related to the recording medium on which the test image is formed; determine whether or not to adjust the image forming condition based on the information; control the image forming unit to form the test image on the recording medium; control, in a case where a type of the recording medium on which the test image is formed is a first type, the image forming condition based on a detection result of the test image by the detection unit; and not control, in a case where a type of the recording medium on which the test image is formed is a second type different from the first type, the image forming condition based on a detection result of the test image by the detection unit.

Further features of the present invention will become apparent from the following description of exemplary embodiments (with reference to the attached drawings).

DESCRIPTION OF THE EMBODIMENTS

Hereinafter, embodiments for carrying out the present invention will be described with reference to the drawings. In order to carry out the present disclosure, various technically desirable limitations are added in the embodiments described below, however, the scope of the invention is not limited to the following embodiments and exemplary drawings.

First Embodiment

Figure 1:
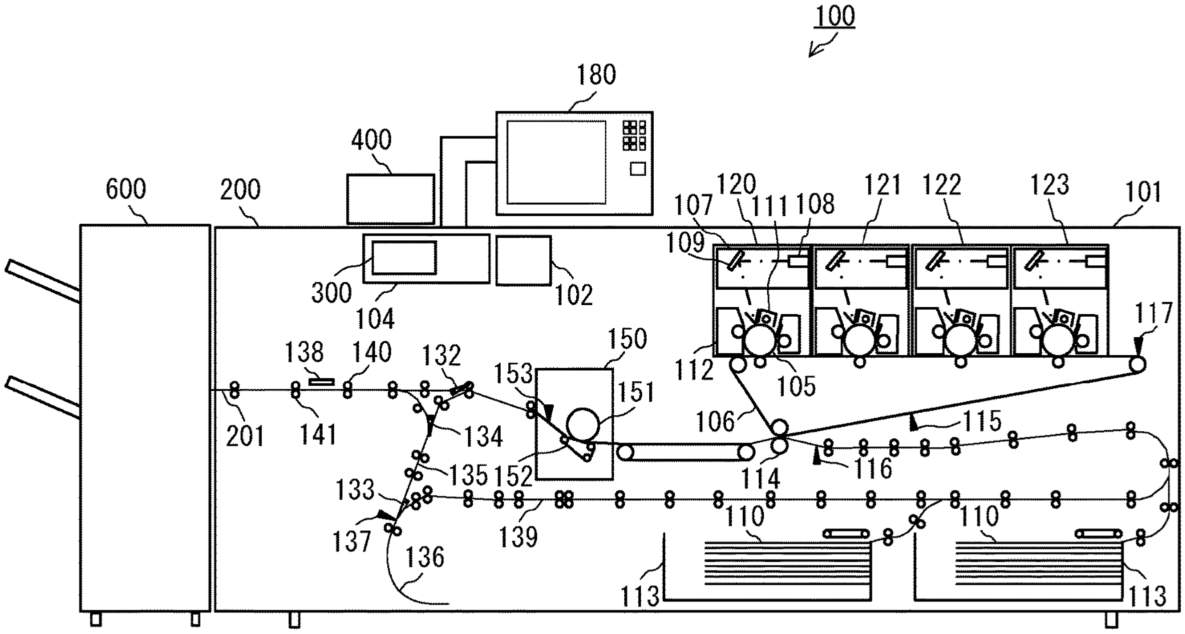
FIG. 1 is a configuration diagram of an image forming apparatus.

FIG. 1 is a configuration view of an image forming apparatus according to this embodiment. An image forming apparatus 100 according to this embodiment includes a printer 101, a reader 400, and a finisher 600. The image forming apparatus 100 (printer 101) forms an image on a sheet-like recording medium 110 by electrophotographic image forming. The printer 101 in this embodiment may be an inkjet printer or a dye-sublimation printer.

The image forming apparatus 100 includes each mechanism constituting an engine unit for image formation in the printer, an engine control unit 102 for controlling the operation of each mechanism, and a control board storage unit 104 for storing a printer controller 300. An operation panel 180 is provided on the upper portion of the printer 101. The operation panel 180 is a user interface, and includes an input device configured to receive instructions from a user, and an output device configured to display a screen such as an operation screen. The input device includes various key buttons and a touch panel and the like. The output device includes a display, a speaker, and the like. A reader 400 is an image reading apparatus which reads an image formed on a recording medium (original) on which an image is formed.

Each mechanism constituting an engine unit includes an electrification exposure processing mechanism, a developing processing mechanism, a transferring processing mechanism, a fixing processing mechanism, a feeding processing mechanism of the recording medium 110, and a conveyance processing mechanism of the recording medium 110. The electrification exposure processing mechanism forms an electrostatic latent image by scanning a laser beam. The developing processing mechanism visualizes an electrostatic latent image. The transferring processing mechanism transfers a toner image generated by visualization on the recording medium 110. The fixing processing mechanism fixes the toner image transferred on the recording medium 110. Each of these mechanisms is composed of image forming units 120, 121, 122, and 123, an intermediate transfer member 106, a fixing device 150, the feeding cassette 113, and the like in the printer 101.

The image forming units 120, 121, 122, and 123 differ only in the color of the formed image, and perform the same operation with the same configuration. The image forming unit 120 forms a yellow (Y) image. The image forming unit 121 forms a magenta (m) image. The image forming unit 122 forms a cyan (C) image. The image forming unit 123 forms a black (K) image. Each image forming units 120, 121, 122, and 123 includes a photosensitive drum 105, a charger 111, a laser scanner 107, and a developing device 112.

The electrification exposure processing mechanism charges a surface of the photosensitive drum by the charger 111, and an electrostatic latent image is formed on the surface of the photosensitive drum 105 by the laser scanner 107. The photosensitive drum 105 is a drum-shaped photoconductor having a photosensitive layer on its surface, and rotates about a drum axis. The charger 111 uniformly charges the photosensitive layer on the surface of the rotating photosensitive drum 105.

The laser scanner 107 includes a light emitting portion 108 configured to scan the laser light emitted from a semiconductor laser in one direction, and a reflective mirror 109 configured to reflect the laser light emitted from the light emitting portion 108 toward the photosensitive drum 105. The laser scanner 107 has a laser driver which drives a laser beam emitted from the light emitting portion 108 according to an image data supplied from the printer controller 300. The laser beam emitted from the semiconductor laser is directed in one direction according to the rotation of the rotating polygon mirror in the light emitting portion 108. The laser beam directed in one direction irradiates the photosensitive drum 105 via the reflective mirror 109. As a result, the laser beam scans the surface of the photosensitive drum 105 in one direction (drum axis direction) to thereby form an electrostatic latent image. A direction in which the laser scanner 107 scans the photosensitive drum 105 (depth direction of FIG. 1) corresponds to a main scanning direction.

The developing processing mechanism visualizes the electrostatic latent image with toner supplied from the developing device 112 to form a toner image on the photosensitive drum 105. The toner image on the photosensitive drum 105 is transferred onto the intermediate transfer member 106, which is an image bearing member to which a voltage having a polarity opposite to that applied to the toner image. At the time of color image forming, the toner images of each color are sequentially transferred from respective photosensitive drum 105 of each of the image forming units 120, 121, 122, and 123 to the intermediate transfer member 106 so as to superimpose the toner images. In the present embodiment, the intermediate transfer member 106 is rotated clockwise in the figures, and the toner images are transferred in the order of image forming unit 120 (yellow), the image forming unit 121 (magenta), the image forming unit (cyan), and the image forming unit 122 (cyan). As a result, a full-color toner image (visible image) is formed on the intermediate transfer member 106. The photosensitive drum 105 and the developing device 112 are removable from the housing of the printer 101.

The transferring processing mechanism transfers a visible image (the toner image) formed on the intermediate transfer member 106 on the recording medium 110 fed from the feeding cassette 113. The transferring processing mechanism includes a transfer roller 114 for transferring the toner image from the intermediate transfer member 106 on the recording medium 110. The images transferred on the intermediate transfer member 106 from each of the image forming units 120, 121, 122, and 123 are conveyed to the transfer rollers 114 as the intermediate transfer member 106 is rotated clockwise in the figure. The recording medium 110 is conveyed to the transfer rollers 114 in synchronization with the timing when the toner image is conveyed to the transfer rollers 114. The transfer rollers 114 are configured to bring the recording medium 110 into pressure-contact with the intermediate transfer member 106 and, at the same time, by applying a bias having a polarity opposite to that of the toner image, the toner image is transferred on the recording medium.

An image forming starting position detection sensor 115 and an image density sensor 117 are arranged around the intermediate transfer member 106. The image forming starting position detection sensor 115 is used for determining a transfer starting position of the toner image to the recording medium 110. The image forming starting position detection sensor 115 is provided on the upstream of the transfer rollers 114 in the rotating direction of the intermediate transfer member 106. The image density sensor 117 is used for detecting a test image for tone correction formed on the intermediate transfer member 106 during image density control. The image density sensor 117 is provided on the downstream side of the image forming unit 123 in the rotation direction of the intermediate transfer member 106.

The feeding processing mechanism includes the feeding cassette 113 for storing the recording medium 110, a conveyance path through which the recording medium 110 is fed, and various rollers for conveying the recording medium 110. The recording medium 110 is fed from the feeding cassette 113, and an image is formed by transferring and fixing the toner image while being conveyed through the conveyance path, and is discharged to an outside of the printer 101. A conveyance direction of the recording medium 110 is a sub-scanning direction which is orthogonal to the main scanning direction.

The recording medium 110 is fed from the feeding cassette 113, and conveyed to the transfer roller 114 through the conveyance path. A feeding timing sensor 116 for adjusting the conveyance timing of the recording medium 110 is arranged in the middle of the control path from the feeding cassette 113 to the transfer roller 114. The timing at which the recording medium 110 is conveyed to the transfer roller 114 is adjusted based on the timing at which the image forming starting position detection sensor 115 detects an image on the intermediate transfer member 106 and the timing at which the feeding timing sensor 116 detects the recording medium 110. As a result, the toner image is transferred from the intermediate transfer member 106 to a predetermined position on the recording medium 110.

The recording medium 110 on which the toner image is transferred is conveyed to the fixing processing mechanism. The fixing processing mechanism of the present embodiment includes the fixing device 150. To perform thermal compression bonding of the toner image to the recording medium 110, the fixing device 150 includes a fixing roller 151 for heating the recording medium 110, a pressure belt 152 for pressing the recording medium 110 to the fixing roller 151, and a post-fixing sensor 153 which detects the completion of fixing. The fixing roller 151, having a heater inside, is a hollow roller and is configured to rotate to convey the recording medium 110. The pressure belt 152 presses the recording medium 110 against the fixing roller 151. The post-fixing sensor 153 detects the recording medium 110 after image is fixed on the same.

After fixing the image on the recording medium 110 by the fixing device 150, the recording medium 110 may be discharged as it is or may be conveyed to the conveyance path 135. Therefore, a flapper 132 is arranged downstream of the fixing device 150. The flapper 132 guides the recording medium 110 to either the conveyance path 135 or the conveyance path 201. The conveyance path 201 has the conveyance rollers 140 and 141. The recording medium 110 guided to the conveyance path 201 is conveyed by the conveyance rollers 140 and 141, and is discharged from the printer 101 to the finisher 600 with the surface on which the image is formed facing up. At a position where the image of the recording medium 110 can be detected between the conveyance roller 140 and the conveyance roller 141 of the conveyance path 201, a colorimetric unit 138 is provided.

The colorimetric unit 138 is an optical sensor such as a CMOS line sensor or a CCD line sensor. The colorimetric unit 138 reads an image formed on the recording medium 110 which is conveyed through the conveyance path 201 by the conveyance rollers 140 and 141. The colorimetric unit 138 outputs reading signals including luminance values of red (R), green (G), and blue (B) as the reading result. The luminance values of these reading signals are converted into density values of each color of cyan (C), magenta (M), yellow (Y), and black (K) to be used. Generally, a density value of cyan is calculated from the brightness value of a red sensor, a density value of magenta is calculated from the brightness value of a green sensor, a density value of yellow is calculated from the brightness value of a blue sensor, and a density value of black is calculated from the brightness value of a green sensor. At that time, the conversion from each luminance value to each color density value is performed using an LUT (Look Up Table) previously generated by obtaining the relationship between each luminance value of RGB and each density value of CMYK. The LUT is previously stored in the image forming apparatus 100.

The conveyance path 135 is a path for conveying the recording medium 110 to an inverse path 136 used for inverting the front and back surfaces of the recording medium 110. The inverse path 136 is provided with an inversion sensor 137 for detecting the recording medium 110. In a case where the inversion sensor 137 detects the rear end of the recording medium 110, the recording medium 110 is inverted in the conveyance direction in the inverse path 136. After inversing the conveyance direction, the recording medium 110 is conveyed to either the conveyance path 135 or an inverse path 139. Therefore, a flapper 133 is provided at a branch point between the conveyance path 135 and the inverse path 139. In a case where the recording medium 110 is conveyed to the conveyance path 135, it is guided to the conveyance path 135 by the flapper 133, then, it is further guided to the conveyance path 201 by a flapper 134. As a result, the front and back surfaces of the recording medium 110 are inverted (the side on which the image is formed faces down), and the recording medium 110 is discharged from the printer 101 to the finisher 600. In a case where the recording medium 110 is conveyed to the inverse path 139, it is guided to the inverse path 139 by the flapper 133. After being guided to the inverse path 139, the front and back surfaces of the recording medium 110 are inverted, and the recording medium 110 is conveyed to the transfer roller 114 again. As a result, an image forming on the back surface of the recording medium 110 is performed.

The finisher 600 obtains, from the printer 101, the recording medium 110 (printed matter) on which the image has been formed. The finisher 600 performs post-treatments such as a stapling treatment and a bookbinding treatment on the obtained printed matter.

<Colorimetric unit>

Figure 2:
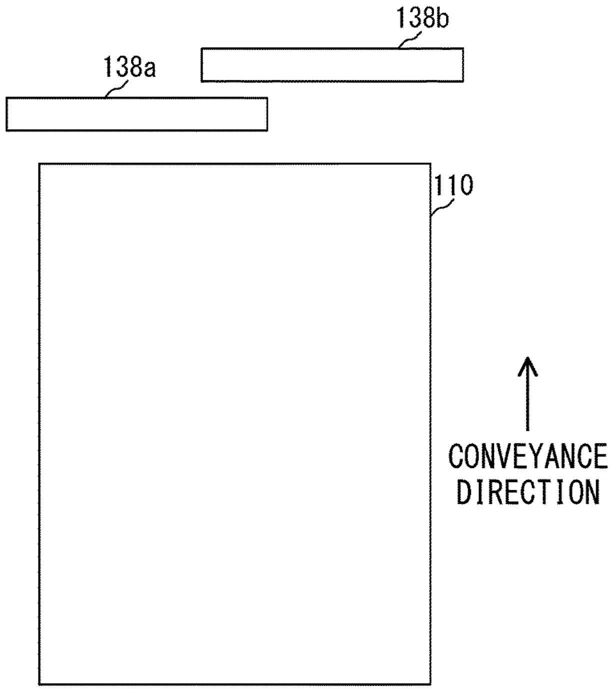
FIG. 2 is a configuration diagram of a colorimetric unit.

FIG. 2 is an explanatory diagram of the colorimetric unit 138. The colorimetric unit 138 includes two line sensors 138*a* and 138*b* arranged to partially overlap in the main scanning direction, which is orthogonal to the conveyance direction of the recording medium 110. Generally, a line sensor having a size which can read a recording medium 110 of A3 size or larger is in low demand and expensive. By using two inexpensive line sensors which can read the recording medium 110 having a size smaller than A3, even when reading a recording medium 110 of A3 size or larger, it is possible to read the same at a low cost.

Figure 3:
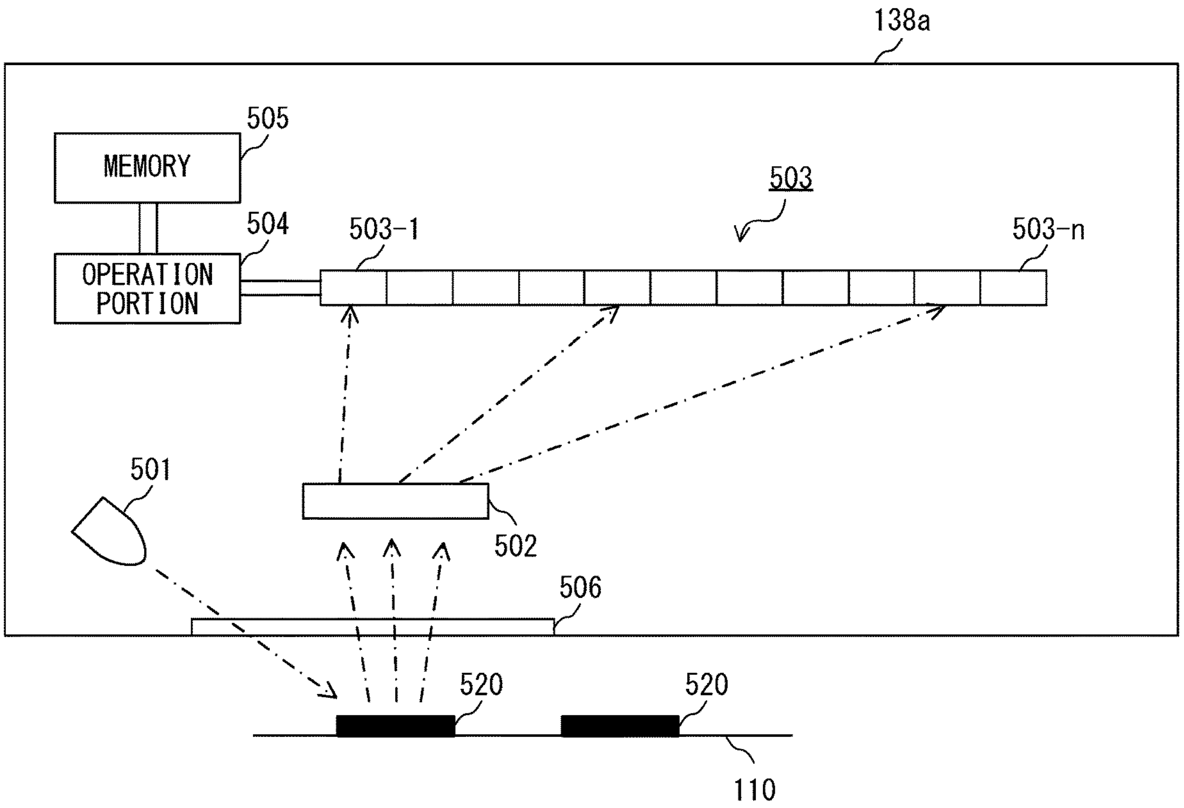
FIG. 3 is an explanatory configuration diagram of a line sensor.

FIG. 3 is a configuration explanatory diagram of the line sensor 138*a*. The line sensor 138*b* has the same configuration. The line sensor 138*a* is an optical sensor which detects the spectral reflectance of the test image 520 formed on the recording medium 110 to perform colorimetric analysis. The line sensor 138*a* includes a white LED (Light Emitting Diode) 501, a diffraction grating 502, a light receiving element row 503, an operation portion 504, a memory 505, and a lens 506.

The white LED 501 is a light emitting portion, and irradiates the recording medium 110 on which the conveyance path 201 is conveyed with light. The diffraction grating 502 disperses the light reflected by the test image 520 for each wavelength. The lens 506 focuses the light emitted from the white LED 501 on the test image 520, and focuses the light reflected by the test image 520 on the diffraction grating 502. The light receiving element row 503 is a light receiving unit having n pixels of light receiving elements 503-1 to 503-*n*. Each of the light receiving elements 503-1 to 503-*n* in the light receiving element row 503 receives the reflected light spectroscopically separated for each wavelength by the diffraction grating 502. Each light receiving element 503-1 to 503-*n* outputs, for example, a voltage (electrical signal) which correlates with the intensity of the received reflected light as a detection result.

The operation portion 504 converts the voltage value output from each light receiving element 503-1 to 503-*n* into a digital signal (light intensity value). The correspondence relationship between each light receiving element 503-1 to 503-*n* and the wavelength is predetermined. Therefore, the light intensity value of each light receiving element 503-1 to 503-*n* corresponds to the reflected light intensity (spectral data) for each wavelength. The operation portion 504 performs spectroscopic calculation of the light intensity value, calculation of the Lab value, and the like. As a result, the operation portion 504 generates a read signal including the luminance values of red (R), green (G), and blue (B). The memory 505 stores therein a light intensity of each wavelength obtained when each of the light receiving elements 503-1 to 503-*n* receives light reflected from a reference member (not shown).

The colorimetric unit 138 of the present embodiment performs forced light emission of a light source (white LED 501) before performing a colorimetry analysis. Since the output value of the light receiving element row 503 is stabilized by the forced light emission, the colorimetric unit 138 has a configuration which is not easily affected by temperature characteristics.

<Printer controller>

Figure 4:
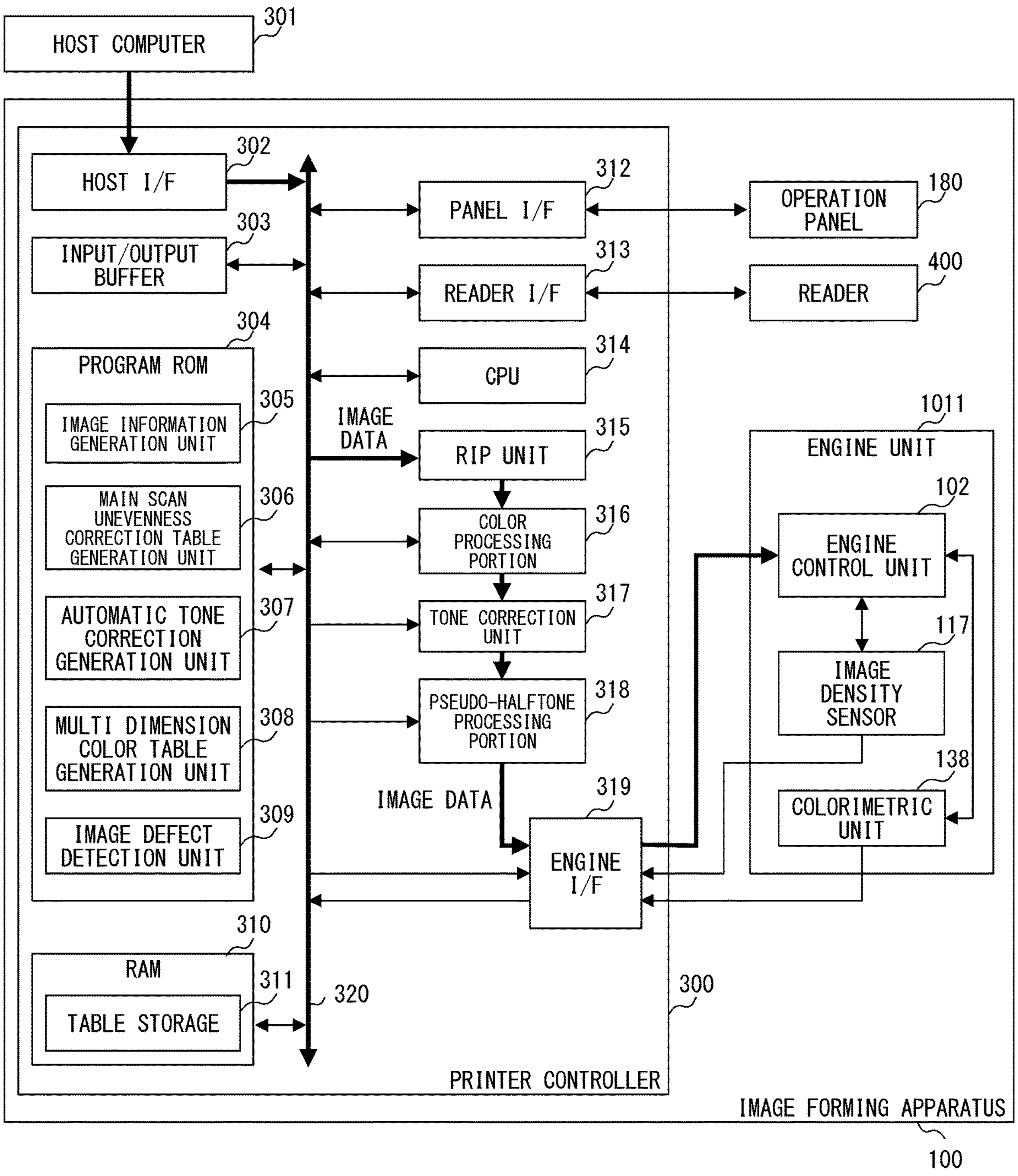
FIG. 4 is an explanatory diagram of a printer controller.

FIG. 4 is an explanatory diagram of the printer controller 300 of the present embodiment. The printer controller 300 is communicably connected to the host computer 301, which is a device provided outside the image forming apparatus 100. The host computer 301 and the image forming apparatus 100 are connected to each other so as to be communicable via a communication line such as USB2.0 High-Speed, 1000 Base-T/100Base-TX/10Base-T (IEEE 802.3 standard) or wirelessly.

The printer controller 300 controls the operation of the entire printer 101. Therefore, the printer controller 300 is connected to the operation panel 180, the reader 400, and the engine unit 1011. The engine unit 1011 controls the operation of each mechanism in the printer 101 in response to an instruction from the printer controller 300 to perform an image forming process on the recording medium 110. The engine unit 1011 includes an engine control unit 102. The engine control unit 102 controls the operation of each mechanism of the engine unit 1011. The engine control unit 102 also controls the detection operation of the test image by the image density sensor 117 and the colorimetric unit 138. The engine control unit 102 comprises, for example, a CPU (Central Processing Unit), an MPU (Micro Processor Unit), an ASIC (Application Specific Integrated Circuit), or the like.

The printer controller 300 has a host interface (I/F) 302, a panel interface (I/F) 312, a reader interface (I/F) 313, an engine interface (I/F), and an input-output buffer 303. The host I/F 302 is a communication interface to communicate with the host computer 301. The panel I/F 312 is a communication interface to communicate with the operation panel 180. The reader I/F 313 is a communication interface to communicate with the reader 400. The engine I/F 319 is a communication interface to communicate with the engine unit 1011. The input-output buffer 303 is a temporary storage area for transmitting and receiving control codes and data via each interface.

A printer controller 300 has a CPU 314 and a program ROM (Read Only Memory) 304 and a RAM (Random Access Memory) 310. The CPU 314 controls the operation of the printer controller 300 by executing a computer program stored in the program ROM 304. The RAM 310 provides a work area which is used when the printer controller 300 executes a process.

The program ROM 304 has, as modules, an image information generation unit 305, a main scan unevenness correction table generation unit 306, an automatic tone correction generation unit 307, a multi dimension color table generation unit (multi dimension color) 308, and an image defect detection unit 309. The image information generation unit 305 generates various image objects based on settings of the data obtained from the host computer 301. The main scan unevenness correction table generation unit 306 generates a main scan unevenness correction table for suppressing the image density unevenness in the main scanning direction by correcting laser emission intensity. The automatic tone correction generation unit 307 generates a tone correction table (γLUT) for performing a single color density tone correction. The multi dimension color table generation unit 308 generates an ICC profile, which is a multi-dimension LUT, in order to correct the variation of the multi dimension color. The image defect detection unit 309 detects an image defect in the image read by the colorimetric unit 138.

The RAM 310 temporarily stores processing results of the image information generation unit 305, the main scan unevenness correction table generation unit 306, the automatic tone correction generation unit 307, and the multi dimension color table generation unit 308. The RAM 310 has a table storage 311. The table storage 311 stores the main scanning unevenness correction table, the γLUT, and the ICC profile.

The printer controller 300 includes a RIP (Raster Image Processor) unit 315, a color processing portion 316, a tone correction unit 317, and a pseudo-halftone processing portion 318. The RIP unit 315 develops an image object (image data) into a bitmap image. The color processing portion 316 performs color conversion processing of multiple colors on the image data developed in the bitmap image by the RIP unit 315 using the ICC profile. The tone correction unit 317 uses γLUT to perform a single color tone correction processing on the image data to which the color conversion processing has been performed by the color processing portion 316. The pseudo-halftone processing portion 318 performs pseudo-halftone processing such as a dither matrix or an error diffusion method on the image data that has been selected by the tone correction unit 317. After performing pseudo-half processing at the pseudo-halftone processing portion 318, the image data is transmitted to the engine unit 1011 via the engine I/F 319. The engine control unit 102 of the engine unit 1011 performs image formation processing based on the image data obtained from the engine I/F 319.

Each part of the printer controller 300 as described above is connected to the system bus 320 and is communicable each other via the system bus 320. The CPU 314 manages and updates, via the system bus 320, the ICC profile, the γLUT, and the main scanning unevenness correction table used at the time of image forming. The CPU 314 enables outputting an image of a desired color by reflecting the latest table in the color processing portion 316, the tone correction unit 317, and the like.

<Test image for the tone correction formed on the recording medium 110>

Figure 5:
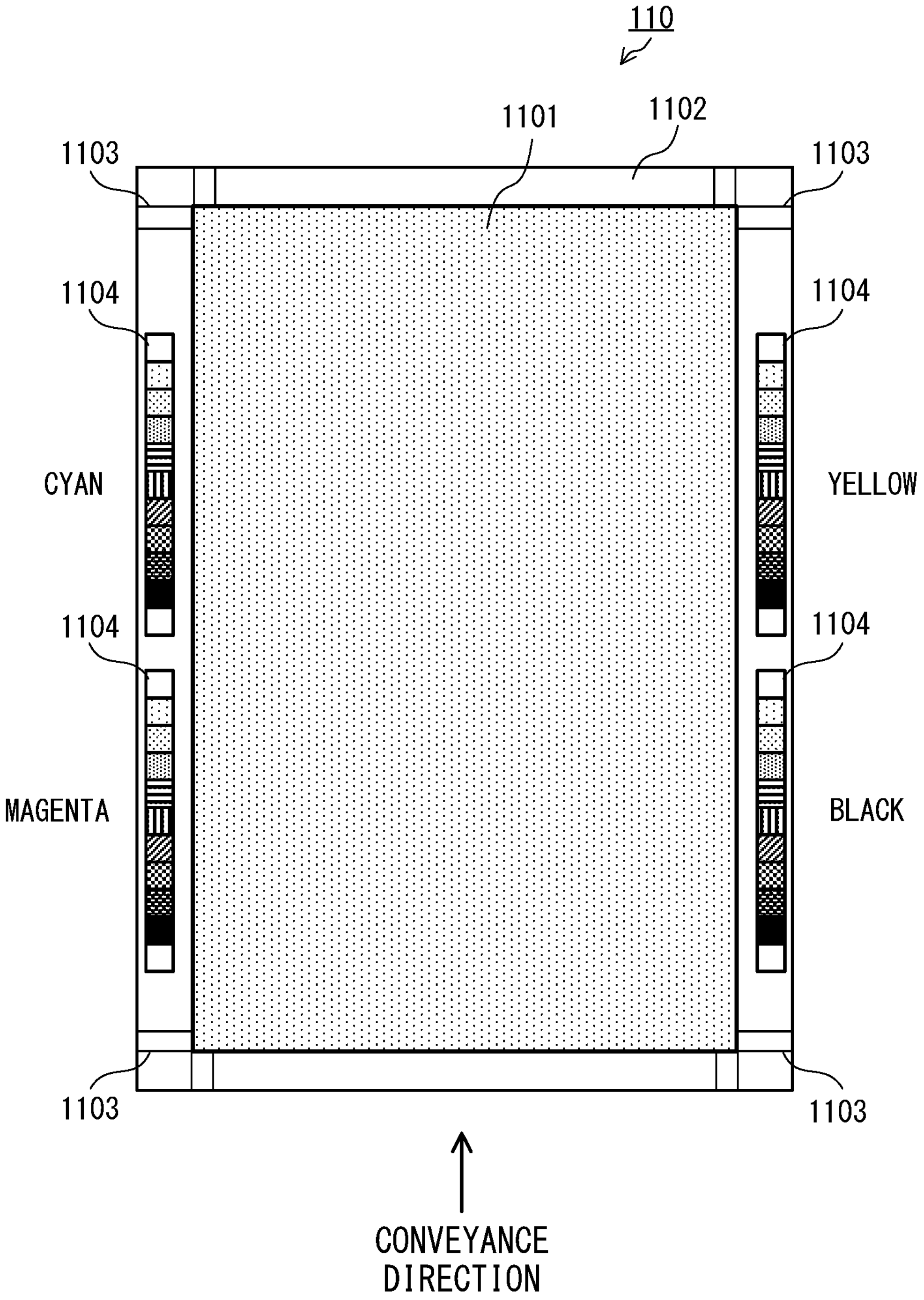
FIG. 5 is an exemplary diagram of a test image.

FIG. 5 is an exemplary diagram of a test image for the tone correction formed on the recording medium 110 together with a user image in response to an instruction from the user. The recording medium 110 is conveyed in the direction of the arrow (the conveyance direction) shown in FIG. 5. The test image for the tone correction (tone correction pattern 1104) formed on the recording medium 110 is formed in an edge region (non-image area 1102) of the recording medium 110 excluding an image area 1101 in which the user image is formed. The tone correction pattern 1104 of this embodiment is formed in the edge region (non-image area 1102) of the recording medium 110 in the conveyance direction. The image area 1101 is an area shown in dots in FIG. 5. A cutting mark 1103 is previously attached to the recording medium 110. The cutting mark 1103 is formed by combining two L-shaped marks and is provided at the four corners of the image area 1101. The recording medium 110 is cut at the cutting mark 1103 by, for example, the finisher 600. The dots in the image area 1101 are shown for the sake of explanation, and are not actually printed on the recording medium 110.

The tone correction pattern 1104 is formed on one surface of the recording medium 110 for each color. The tone correction pattern 1104 is usually formed in the non-image area 1102 outside the image area 1101 so as to not overlap with the image area 1101. However, in a case where the CPU 314 determines to perform the image forming such that the image overlaps with the image area 1101, the tone correction pattern 1104 may be formed overlapping with the image area 1101. In the present embodiment, "overlapping with the image area 1101" means not only the case where the image is formed only in the image area 1101 but also the case where the image is formed to overlap with both the image area 1101 and the non-image area 1102.

The tone correction pattern 1104 may be formed on any of the peripheral portions of the recording medium 110. In the present embodiment, the tone correction pattern 1104 is formed at both ends of the recording medium 110 in a direction orthogonal to the conveyance direction (longitudinal direction of the recording medium 110) of the recording medium 110 (lateral side direction of the recording medium 110). That is, the two-color of the tone correction pattern 1104 are formed at one end of the recording medium 110 in the lateral direction, and the remaining two-color of the tone correction pattern 1104 are formed at the other end of the recording medium 110 in the lateral direction. In the present embodiment, as to the cyan and magenta, the tone correction patterns 1104 are formed at one end of the recording medium 110 in the lateral direction (left end of FIG. 5), and as to the yellow and black, the tone correction patterns 1104 are formed at one end of the recording medium 110 in the lateral direction (right end of FIG. 5). As a result, the tone correction pattern 1104 is not formed at the edge of the conveyance direction of the recording medium 110, and the occurrence of winding of the recording medium 110 around the fixing roller 151 during fixing processing can be more reliably suppressed.

The tone correction pattern 1104 is composed of a plurality of tone patches (11 tones in FIG. 5) in which the tone values of each color varies in steps. Each of the plurality of tone patches is, for example, a square shape having a side of about 8 mm, and is arranged in a row in the conveyance direction.

As to the tone patch of each color, a tone patch for detecting the texture of the recording medium 110 (that is, a tone patch having a tone value of 0) is arranged at both ends of the conveyance direction of the recording medium 110. Nine tone patches with evenly distributed tone values are arranged between the tone patches each having the tone value of 0. In a case where the tone value is represented by 0 to 255, the tone correction pattern 1104 is composed of tone patches having a tone values of 0, 16, 32, 64, 86, 104, 128, 176, 224, 255, and 0. The tone correction pattern 1104 is not limited to yellow, magenta, cyan, and black, and may be composed of each color of red, green, and blue, or process black. Further, the size and an order of the tone should not be limited.

<Processing for determining usable recording medium>

Figure 6:
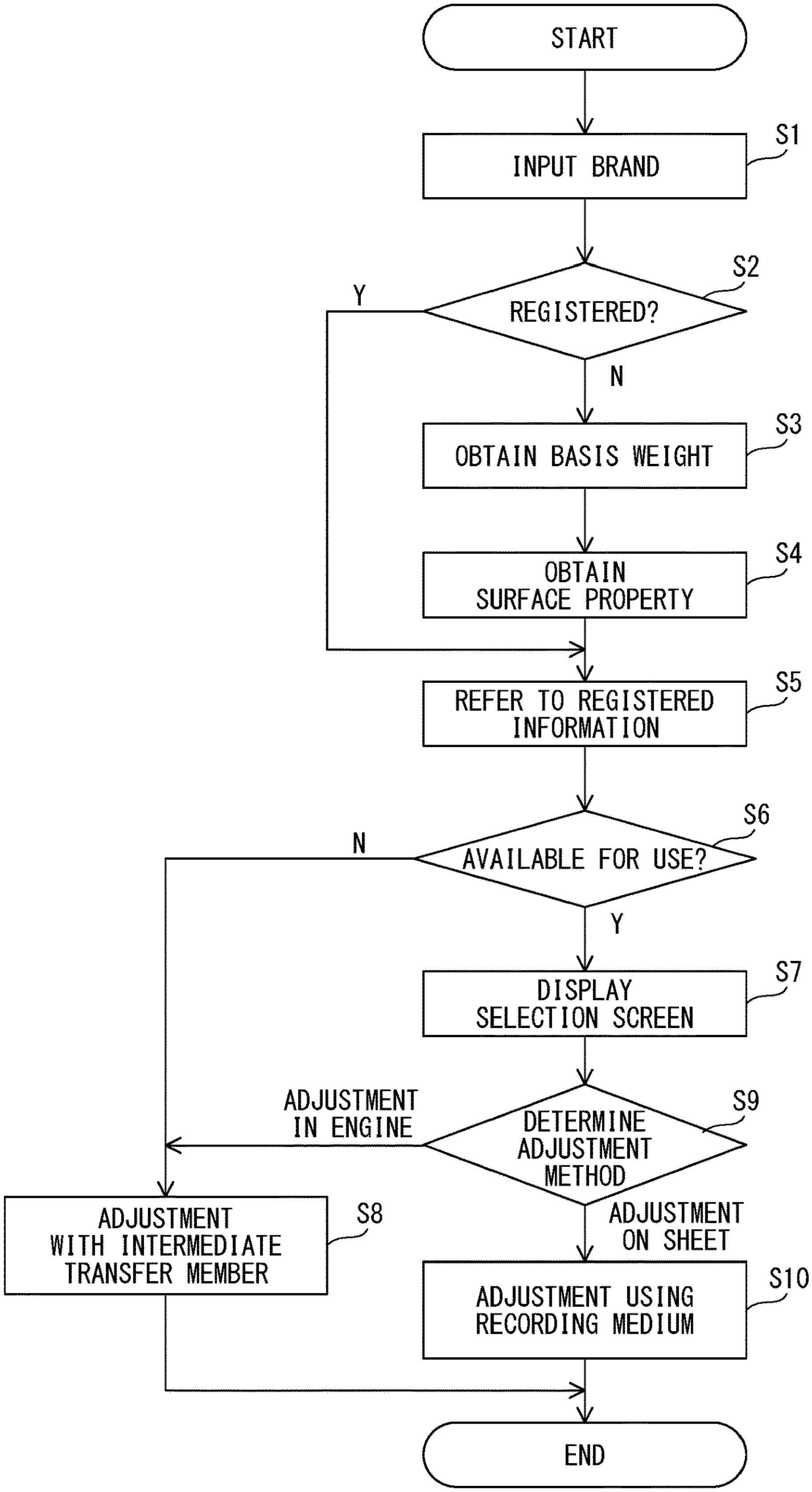
FIG. 6 is a flow chart for determining whether a recording medium can be used for adjusting an image forming condition or not.

The recording medium 110 may have a large variation in the measurement result of the test image by the colorimetric unit 138 due to the surface property and the like. This causes a decrease in image adjustment accuracy. Therefore, an acceptable type of recording medium 110 used for adjusting the image forming condition such as the tone correction is selected. FIG. 6 is a flowchart representing the processing of determining whether or not the recording medium 110 can be used for adjusting the image forming condition. As to the feeding cassette 113, in a case where a recording medium of a different type than previously stored in the feeding cassette 113, the user registers the recording medium 110 with the operation panel 180.

Figure 7:
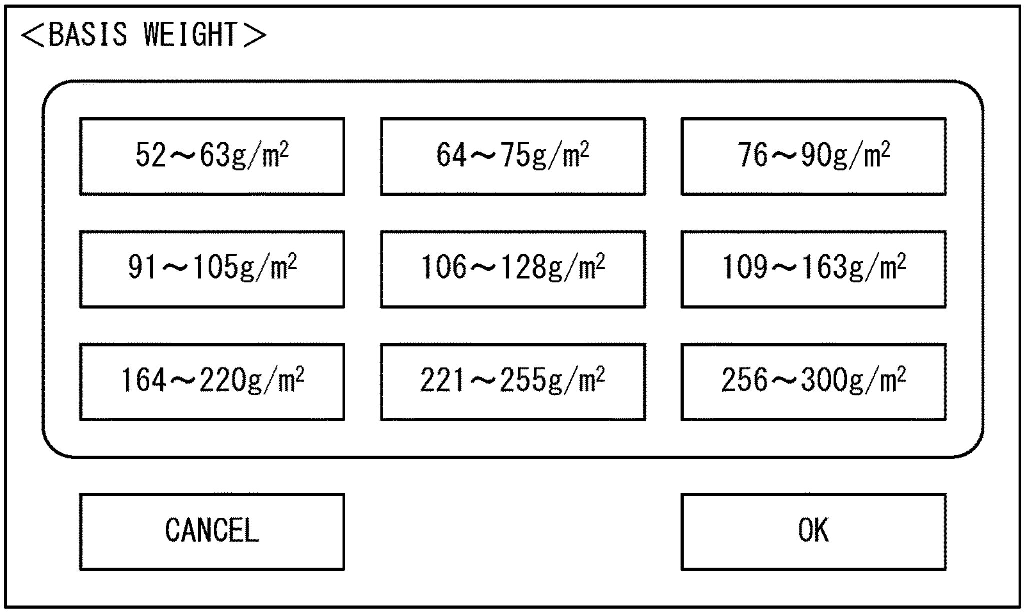
FIG. 7 is an exemplary diagram of a setting screen.

The CPU 314 receives brand information of the recording medium 110 stored in the feeding cassette 113 from the operation panel 180 (Step S1). The CPU 314 determines whether or not the received brand is a brand that has already been registered (Step S2). When the received brand has not been registered (Step S2: N), the CPU 314 performs registration information obtaining processing. The registration information is characteristic information such as basis weight and the surface property of the recording medium 110. The CPU 314 displays a basis weight setting screen illustrated in FIG. 7 on the operation panel 180, and prompts the user to input the basis weight. The user inputs the corresponding basis weight from the setting screen displayed on the operation panel 180. The CPU 314 obtains the information of the basis weight input from the operation panel 180 (Step S3).

The basis weight is used not only for determining the use of the recording medium 110 for image adjustment, but also for optimizing various control values (for example, a high voltage setting at the time of transfer and a temperature setting at the time of fixing) in the image forming apparatus 100. In the present embodiment, the range of the basis weight acceptable for image adjustment, when the recording medium 110 is high-quality paper, is limited to 56 g/m /\2 or more.

Figure 8:
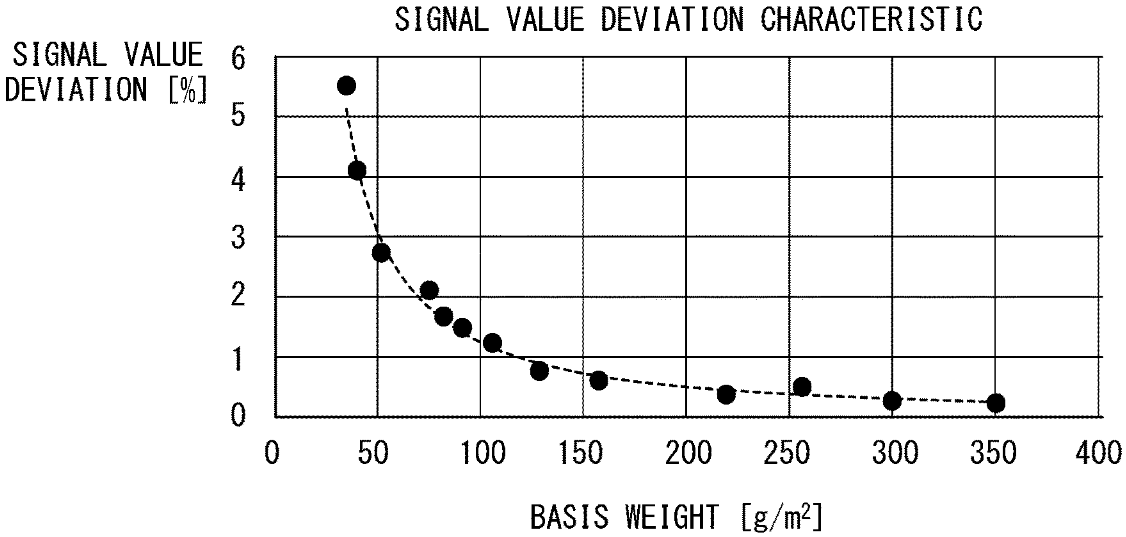
FIG. 8 is an explanatory diagram of a relationship between basis weight and an amount of noise component.

FIG. 8 is an explanatory diagram of the relationship between the basis weight of the high-quality paper and the noise component amount of the reflected light amount of the white background portion (i.e., a portion where the image is not formed) detected by the colorimetric unit 138. As is clear from FIG. 8, the amount of noise component in the white area increases as the basis weight decreases. This is because the rigidity of the recording medium 110 is low and the behavior of the recording medium 110 becomes unstable at a detection position of the colorimetric unit 138, thus the amount of light reflected by the recording medium 110 becomes unstable.

In the present embodiment, the target value of the variation in the detection accuracy of the white background portion is set to 3% or less. This is a threshold value for achieving the target accuracy ($\Delta E \leq 1$) of image adjustment such as image density correction. This threshold value (target value) is not limited to 3%, and may be a different value depending on the characteristics of the sensor to be detected and the correction processing accuracy.

Figure 9:
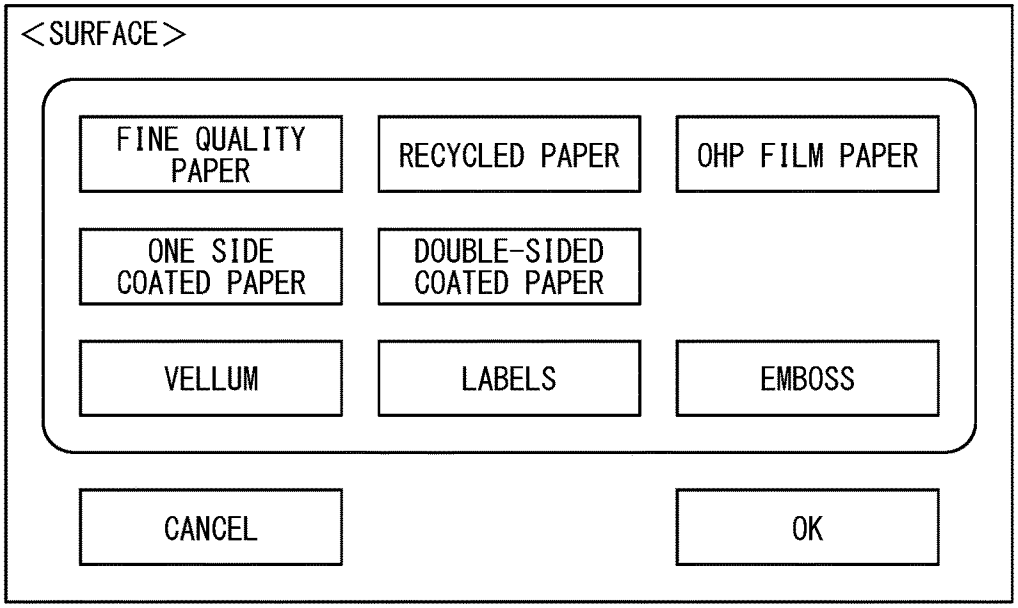
FIG. 9 is an exemplary diagram of a setting screen.

The CPU 314, after obtaining the basis weight information, displays a surface property setting screen of the recording medium 110 illustrated in FIG. 9 on the operation panel 180, and prompts the user to input the surface property. The user inputs the corresponding surface property from the setting screen displayed on the operation panel 180. The CPU 314 obtains the surface property information input from the operation panel 180 (Step S4).

Figure 10:
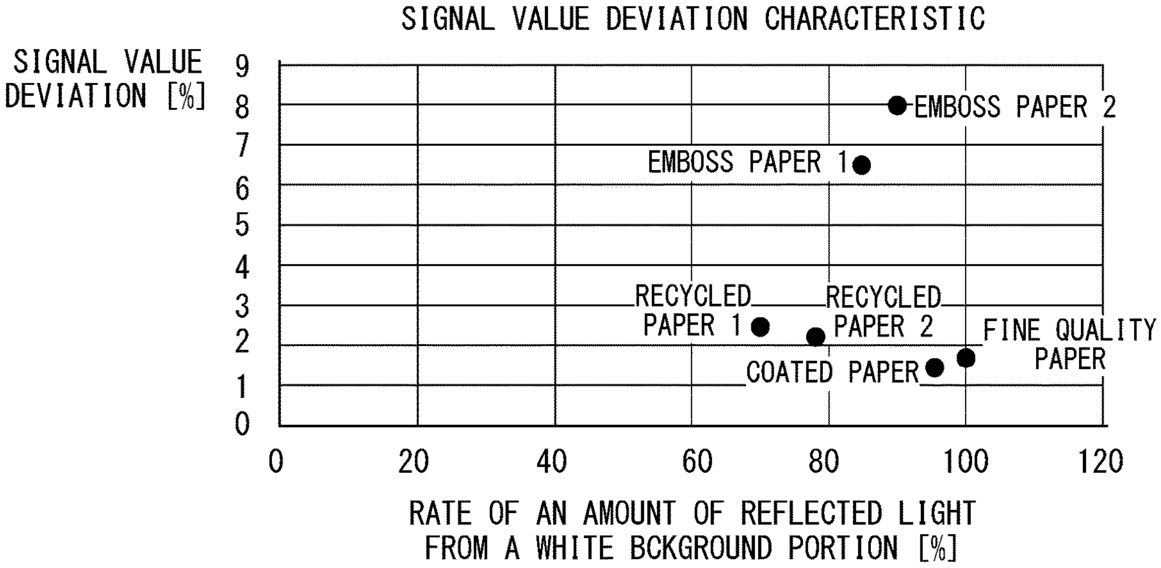
FIG. 10 is an exemplary diagram of a rate of the average reflective light amount and a deviation amount of an amount of reflected light from a white background portion.

FIG. 10 is an exemplary diagram of an average reflected light amount rate for each type of surface of the recording medium 110 and a deviation amount of the reflected light amount in the white background portion. The average reflected light amount ratio is calculated based on the reflected light amount when the colorimetric unit 138 detects high-quality paper satisfying a predetermined standard. As is clear from FIG. 10, the amount of the deviation amount is large in a part of the embossed paper or the recycled paper. This is due to the scattering of reflected light due to the unevenness of the surface of the recording medium 110 and the non-uniformity of the paper fibers forming the recording medium 110.

In the present embodiment, the average reflected light amount rate is 85% or more as a necessary condition (threshold value) of the recording medium 110 used for adjusting the image forming condition. If it is lower than this value, the signal value difference (dynamic range) between the white background and the test image becomes small, and the correction accuracy cannot meet the target. The signal value deviation is set to 3% or less. In this embodiment, high-quality paper, single-sided coated paper, and double-sided coated paper can be used.

As registration information, the CPU 314 associates the obtained basis weight and surface properties with the brand of the recording medium 110 and stores them in the program ROM 304 or a non-volatile storage area of the RAM 310. The registration information of the registered brand is also stored in this storage area. In the process of Step S2, this storage area is referred to determine presence or absence of registration.

When the received brand has already been registered (Step S2: Y), or after registering new registration information, the CPU 314 refers to the registration information (basis weight, surface quality) of the brand (Step S5). The CPU 314 determines whether or not the recording medium 110 of the brand can be used for adjusting the image forming condition based on the referenced registration information (Step S6). The CPU 314 compares the basis weight and the surface property with the respective threshold values, and determines whether or not it can be used based on the comparison result. For example, in a case where the surface properties has the variation in the detection accuracy of the white background below the target value and the reflected light amount rate above the specified value such that the variation in the detection accuracy of the white background is below the target value, the CPU determines that the brand of the recording medium 110 can be used.

Figure 11:
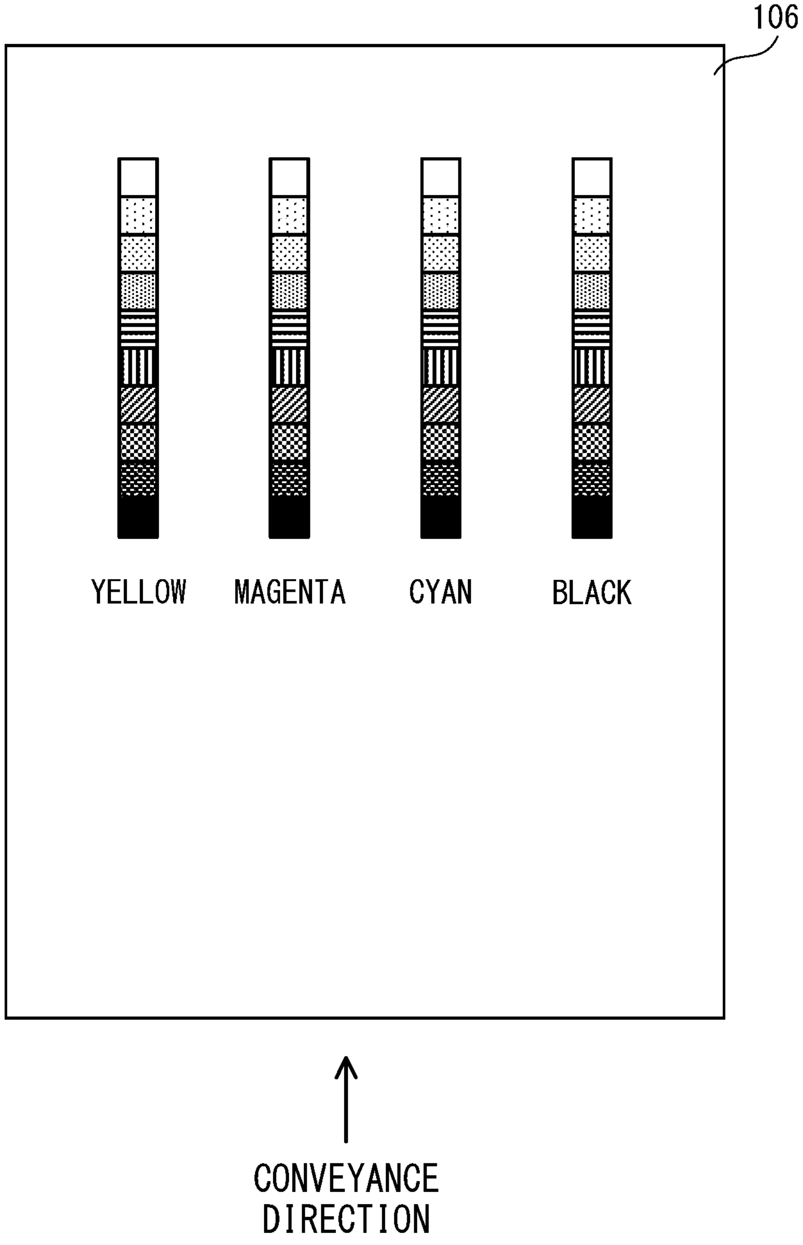
FIG. 11 is an exemplary diagram of a test image on an intermediate transfer member.

In a case where the recording medium 110 cannot be used (Step S6: N), the CPU 314 adjusts the image forming condition using the intermediate transfer member 106 (Step S8). FIG. 11 is an exemplary diagram of a test image for the tone correction formed on the intermediate transfer member 106 of this embodiment. Four image density sensors 117 are arranged in a direction orthogonal to the rotation direction of the intermediate transfer member 106, and the measurement color of each of four image density sensors 117 is predetermined. The test image (tone correction pattern) is composed of 10 tone patches, each having a different tone value for each color. The tone correction patterns are read by the image density sensor 117. The image density is stably maintained by correcting the image forming condition according to the difference between the tone characteristic obtained from the reading result of the image density sensor 117 and the target tone characteristic. In this embodiment, the image quality is stabilized by adjusting the image forming condition using the intermediate transfer member 106 by increasing a space between the sheets, as to each of 200 sheets of the recording medium 110, every time it passes through.

Of course, the arrangement of the image density sensor 117 and the tone patch is not limited to this, and these may be outside a range in which the user image on the intermediate transfer member 106 is formed in the direction orthogonal to the rotation direction. In that case, it is possible to adjust the image forming condition using the intermediate transfer member 106 while performing normal image forming. Therefore, productivity can be maintained.

Figure 12:
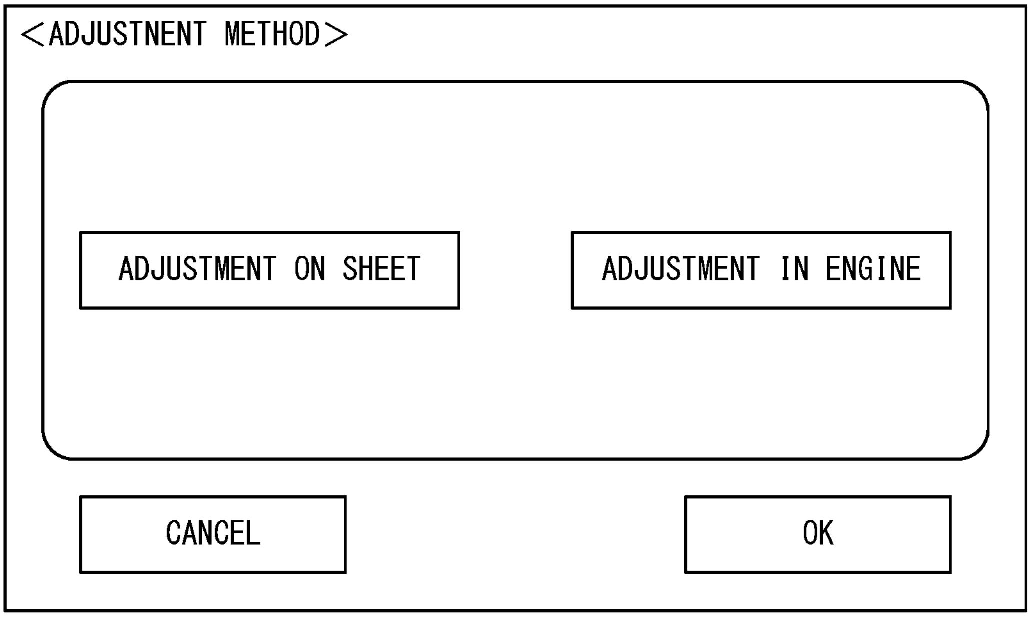
FIG. 12 is an exemplary diagram of a selection screen.

In a case where the recording medium 110 can be used (Step S6: Y), the CPU 314 displays a selection screen shown in FIG. 12 on the operation panel 180 (Step S7). On the selection screen, either adjustment of the image forming condition (adjustment on sheet) using a recording medium 110 of a type determined to be available for use or adjustment of image forming condition using the intermediate transfer member 106 by the image density sensor 117 (adjustment in engine) can be selected. When the user selects either of them from the operation panel 180, the image forming condition is adjusted by the selected method. The CPU 314 determines which adjustment method is selected from the selection screen (Step S9). When the adjustment in engine is selected (Step S9: adjustment in engine), the CPU 314 performs the processing of S8. When the adjustment on sheet is selected (Step S9: adjustment on sheet), the CPU 314 forms a test image (tone correction pattern) on the recording medium 110. The CPU 314 adjusts the image forming condition based on the measurement result of the colorimetric unit 138 of the test image on the recording medium 110 (Step S10).

In this way, based on the characteristics of the recording medium 110, it is determined whether or not the recording medium 110 can be used for adjusting the image forming condition. If it cannot be used, the image forming condition is not adjusted using the recording medium 110. As a result, it is possible to prevent the measurement result of the test image from lowering the image adjustment accuracy due to great variation depending on the type of the recording medium 110. That is, it is possible to determine whether or not the recording medium can be used for adjusting the image forming condition and stabilizing the image adjustment accuracy.

Figure 13:
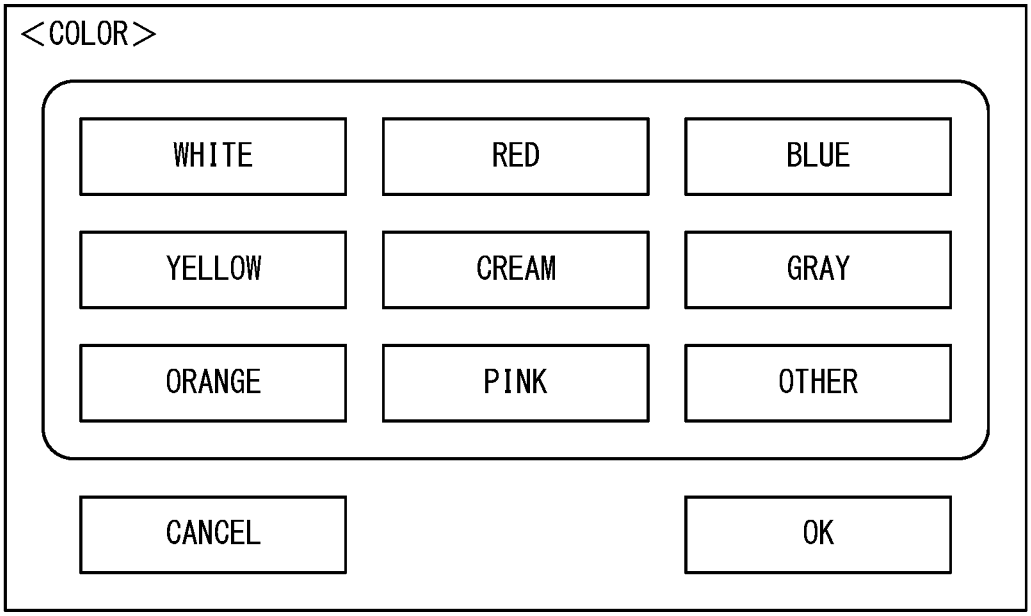
FIG. 13 is an exemplary diagram of a setting screen.

As for the characteristics of the recording medium 110, further to the basis weight and surface properties, the color of the recording medium 110 may be added. FIG. 13 is an exemplary diagram of the color setting screen of the recording medium 110. When the color of the recording medium 110 is dark, the dynamic range, as a result of measuring the image density of the tone patch of the test image of a specific color, becomes small, thus the adjustment accuracy may decrease. Therefore, it is determined that the recording medium 110 having dark color cannot be used for adjusting the image forming condition.

Second Embodiment

Figure 14:
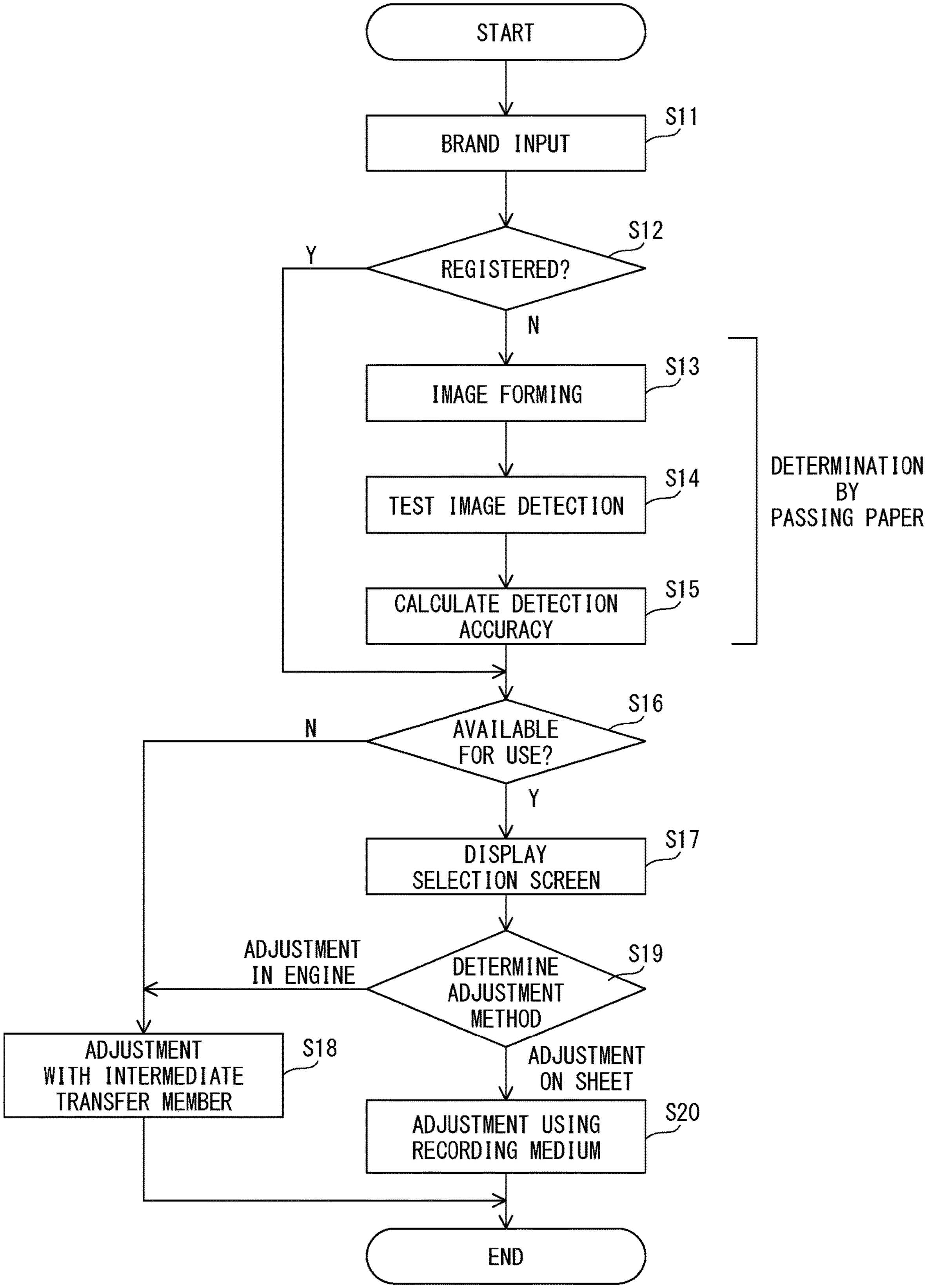
FIG. 14 is a flow chart for determining whether a recording medium can be used for adjusting an image forming condition or not.

In recent years, the recording medium 110 having various characteristics has been used for image formation in order to satisfy the needs of the user. In this case, in addition to registering the characteristics of the recording medium 110, the characteristics of the recording medium 110 may be detected based on the detection result of the colorimetric unit 138. FIG. 14 is a flowchart representing processing of determining whether or not the recording medium 110 can be used for adjusting the image forming condition based on the detection result of the colorimetric unit 138. Since the configurations of the image forming apparatus 100 and the printer controller 300 of the second embodiment are the same as those of the first embodiment, the description thereof will be omitted.

When the recording medium 110 is to be stored in the feeding cassette 113, the user registers the recording medium 110 by the operation panel 180. The CPU 314 receives the brand information of the recording medium 11 stored in the feeding cassette 113 from the operation panel 180 (Step S11). The CPU 314 determines whether or not the received brand is a brand which has already been registered (Step S12). When the received brand has already been registered (Step S12: Y), it means that the CPU 314 has already determined whether or not the recording medium 110 can be used for image adjustment, and the determination result has been also registered. When the recording medium 110 cannot be used (Step S16: N), the CPU 314 adjusts the image forming condition using the intermediate transfer member 106 in the same manner as in the processing of S8 in FIG. 6 (Step S18). When the recording medium 110 can be used (Step S16: Y), the CPU 314 displays the selection screen illustrated in FIG. 12 on the operation panel 180 (Step S17). The CPU 314 determines which adjustment method is selected from the selection screen (Step S19). When the adjustment in engine is selected (Step S19: adjustment in engine), the CPU 314 performs the processing of Step S18. When the sheet adjustment is selected (Step S9: sheet adjustment), the CPU 314 adjusts the image formation condition using the recording medium 110 in the same manner as in the process of Step S20 in FIG. 6 (Step S20).

Figure 15:
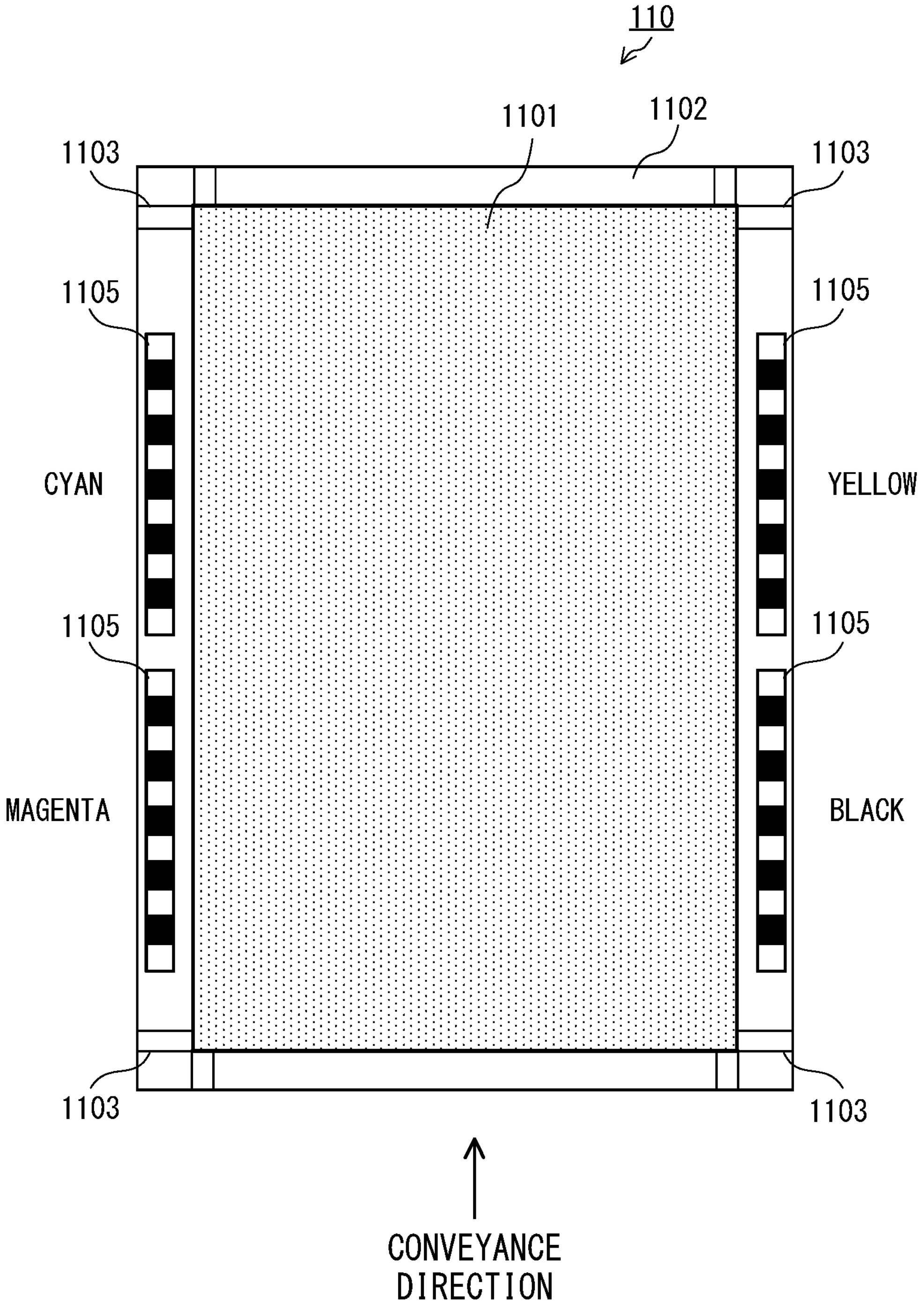
FIG. 15 is an exemplary diagram of a test image.

When the received brand has not been registered (Step S12: N), the CPU 314 passes through the recording medium 110 and determines whether or not it can be used for adjusting the image forming condition. Therefore, the CPU 314 first controls the engine unit 1011 to form a test image on the recording medium 110 for determining whether or not it can be used for adjusting the image forming condition (Step S13). FIG. 15 is an exemplary diagram of the test image. In the test image of FIG. 15, the position of the tone correction pattern 1105 is the same as the position of the tone correction pattern 1104 of the test image of FIG. 5. No user image is formed in the image area 1101. The color of the tone patch of the tone correction pattern 1105 is different from the color of the tone patch of the tone correction pattern 1104.

Specifically, the tone patch includes a large amount of white background (non-image forming portion). In order to detect the image density with high accuracy, the stability of the level of the white background in the reflected light amount is important. Therefore, the tone correction pattern 1105 has a configuration in which 6 patches out of all 11 tone patches are used as the white backgrounds to increase the range of the white background. In addition, in the colored tone patch, many high image densities of the same tone value are provided. In the example of FIG. 15, 5 patches out of all 11 tone patches have 255 level tone values. With such tone correction pattern 1105, it is possible to determine whether or not the transferability, which depends on the resistance of the recording medium 110, and the fixing property, which depends on the heat capacity, are stable.

The test image formed on the recording medium 110 is conveyed in a normal sheet control path. The CPU 314 detects the test image by the colorimetric unit 138 (Step S14). The CPU 314 calculates the detection accuracy based on the detection result by the colorimetric unit 138 (Step S15). The CPU 314 determines whether or not the recording medium 110 can be used for the image adjustment on the sheet based on the detection accuracy (Step S16).

In the present embodiment, the detection accuracy is represented by two items, a variation of the white background portion of the detection result and a dynamic range. When both items satisfy the condition, the CPU 314 determines that the recording medium 110 can be used for image adjustment. Each determination criterion (threshold value) has a detection error $\Delta E \leq 1$. The determination of the variation of the white background portion is performed by using the detection result of the white background portion of a predetermined number (here, the number is five) for each color. The CPU 314 determines the variation of the white background portion depending on whether or not the variation of each detection result is within a predetermined range (for example, 2% or less). Further, the CPU 314 detects the image density from the detection result of the white background portion, and determines the variation of the dynamic range depending on whether or not the difference (dynamic range) from the image density of the solid portion is smaller than the predetermined value. When the dynamic range is smaller than a predetermined value, the sensitivity for reading the amount of change in the image density is decreased to thereby decrease the correction accuracy. In the present embodiment, the dynamic range of the high-quality paper satisfying a predetermined standard is used as a reference value, and the variation in the dynamic range is determined based on whether or not 90% or more of the dynamic range is obtained.

When the recording medium 110 cannot be used (Step S16: N), the CPU 314 performs the process of Step S18. When the recording medium 110 can be used (Step S16: Y), the CPU 314 performs the processing of Steps S17 to S20.

Even when the characteristics of the recording medium 110 are not input as above, it is possible to determine whether or not the recording medium 110 can be used for the image adjustment based on the detection result by the colorimetric unit 138. If it cannot be used, the image forming condition are not adjusted using the recording medium 110. Therefore, also in the present embodiment, it is possible to determine whether or not the recording medium can be used for adjusting the image forming condition and stabilize the image adjustment accuracy.

The criterion for determining whether or not the colorimetric unit can be used is merely an example. For example, in order to determine the behavior of the recording medium 110 at the reading position of the colorimetric unit 138 with higher accuracy, the tone correction pattern 1104 may be entirely white. Further, in order to use the transferability and fixability of the recording medium 110 as the criterion, the entire recording medium 110 may be used as a solid image. Further, the number of recording media 110 to be passed through may be increased to make a determination in another tone range.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions This application claims the benefit of Japanese Patent Application No. 2021-087818, filed May 25, 2021, which is hereby incorporated by reference herein in its entirety.

What is claimed is:

1. An image forming apparatus comprising:
a cassette configured to store a recording medium;
an image former configured to form an image on the recording medium conveyed from the cassette based on an image forming condition;
a conveyance roller configured to convey the recording medium on which the image is formed by the image former in a conveyance path;
a reading unit configured to read a test image on the recording medium conveyed to the conveyance path by the conveyance roller, the test image being formed by the image former; and ; and
a controller configured to:
obtain information related to a characteristic of the recording medium to be conveyed from the cassette to the image former; and
control, based on the information, execution of a process including formation of the test image by the image former and generation of the image forming condition based on a reading result of the test image read by the reading unit.

2. The image forming apparatus according to claim 1,
wherein the image former has an image bearing member and a sensor configured to measure a measurement image on the image bearing member;
wherein the image former forms the measurement image different from the test image on the image bearing member;
wherein, the controller generates the image forming condition based on a measurement result of the measurement image measured by the sensor.

3. The image forming apparatus according to claim 1,
wherein the reading unit is configured to read a second test image on the recording medium while the recording medium is conveyed.

4. The image forming apparatus according to claim 1,
wherein the information includes information of a basis weight of the recording medium and information related to a surface property of the recording medium.

5. The image forming apparatus according to claim 4,
wherein the information related to the surface property is an average reflected light amount rate for a surface of the recording medium.

6. The image forming apparatus according to claim 1,
wherein the controller obtains the information including a basis weight of the recording medium and an average reflected light amount rate for a surface of the recording medium,
wherein the controller is configured to control the execution of the process based on a comparison result of the basis weight and a threshold and a comparison result of the average reflected light amount rate and a threshold rate.

7. The image forming apparatus according to claim 6,
wherein the controller is configured to execute the process in a case where the basis weight is more than or equal to the threshold and the average reflected light amount rate is more than or equal to the threshold rate.

8. The image forming apparatus according to claim 1,
wherein the controller obtains the information including a basis weight of the recording medium, and does not execute the process in a case where the basis weight is less than the threshold.

9. The image forming apparatus according to claim 1,
wherein the controller obtains the information including an average reflected light amount rate for a surface of the recording medium, and
wherein the controller does not execute the process in a case where the average reflected light amount rate is less than a threshold rate.

10. The image forming apparatus according to claim 1,
wherein the information includes information of a color of the recording medium.

11. The image forming apparatus according to claim 1, wherein, in a case where the controller does not perform the process, the test image is not formed on the recording medium by the image former.

* * * * *